US012669588B2

(12) United States Patent
Asami et al.

(10) Patent No.: US 12,669,588 B2
(45) Date of Patent: Jun. 30, 2026

(54) LASER RADAR DEVICE

(71) Applicant: DENSO CORPORATION, Kariya-city (JP)

(72) Inventors: Hiroshi Asami, Kariya-city (JP); Kazuhisa Onda, Kariya-city (JP); Mitsuhiro Kiyono, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 786 days.

(21) Appl. No.: 18/178,607

(22) Filed: Mar. 6, 2023

(65) Prior Publication Data

US 2023/0221417 A1 Jul. 13, 2023

Related U.S. Application Data

(63) Continuation of application No. PCT/JP2021/039250, filed on Oct. 25, 2021.

(30) Foreign Application Priority Data

Nov. 6, 2020 (JP) ................................. 2020-185920

(51) Int. Cl.
*G01S 7/481* (2006.01)
*G01S 17/931* (2020.01)

(52) U.S. Cl.
CPC ........... *G01S 7/4817* (2013.01); *G01S 7/4811* (2013.01); *G01S 7/4813* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 10,340,651 B1 | 7/2019 | Drummer et al. | |
| 2007/0058230 A1* | 3/2007 | Blug .................... | G02B 26/105 |
| | | | 250/234 |
| 2012/0187283 A1 | 7/2012 | Yamada et al. | |
| 2017/0322075 A1* | 11/2017 | Lorenzoni ............. | G01J 1/0414 |
| 2018/0284282 A1 | 10/2018 | Hong et al. | |
| 2019/0041501 A1 | 2/2019 | Noguchi | |
| 2019/0123508 A1 | 4/2019 | Hong et al. | |

(Continued)

FOREIGN PATENT DOCUMENTS

| | | |
|---|---|---|
| CN | 109581328 A | 4/2019 |
| EP | 2375266 A1 | 10/2011 |

(Continued)

*Primary Examiner* — Eric L Bolda
(74) *Attorney, Agent, or Firm* — Posz Law Group, PLC

(57) ABSTRACT

A laser radar device includes: a light source; a mirror rotatable about a rotation shaft to reflect laser light emitted by the light source; a window; and a detector to detect laser light. The mirror has a low reflection area having a lower reflectance than the other region of the mirror, in a state where a mirror surface faces toward the light source, at position adjacent to the light source than the detector in an axial direction of the rotation shaft and adjacent to the window than a region where the laser light emitted by the light source hits for a first time in a radial direction of the rotation shaft. The window has an inclined posture in which a distance from the rotation shaft is shorter at position adjacent to the detector than at position adjacent to the light source.

7 Claims, 9 Drawing Sheets

(56)             References Cited

U.S. PATENT DOCUMENTS

| | | | |
|---|---|---|---|
| 2019/0242981 A1 | 8/2019 | Otani et al. | |
| 2020/0343683 A1 | 10/2020 | Hong et al. | |
| 2021/0341730 A1* | 11/2021 | Suzuki | ..................... B81B 3/00 |

FOREIGN PATENT DOCUMENTS

| | | | |
|---|---|---|---|
| JP | 2009-63339 A | 3/2009 | |
| JP | 2019-152588 A | 9/2019 | |

* cited by examiner

LASER RADAR DEVICE

CROSS REFERENCE TO RELATED APPLICATIONS

The present application is a continuation application of International Patent Application No. PCT/JP2021/039250 filed on Oct. 25, 2021, which designated the U.S. and claims the benefit of priority from Japanese Patent Application No. 2020-185920 filed in on Nov. 6, 2020. The entire disclosures of all of the above applications are incorporated herein by reference.

TECHNICAL FIELD

The present disclosure relates to a laser radar device, and more particularly to technology for suppressing detection of stray light.

BACKGROUND

A device suppresses detection of stray light by a detector. The device includes a light blocking section that partitions a light projecting space and a light receiving space in order to suppress stray light from entering the light receiving space from the light projecting space.

SUMMARY

According to one aspect of the disclosure, a laser radar device includes: a light source configured to emit laser light; a mirror rotatable about a rotation shaft to reflect the laser light emitted by the light source; a window through which the laser light reflected by the mirror passes; and a detector configured to detect the laser light passing through the window to be reflected by the mirror. The mirror has a low reflection area having a lower reflectance than the other region of the mirror, in a state where a mirror surface of the mirror faces toward the light source, at position adjacent to the light source than the detector in an axial direction of the rotation shaft and adjacent to the window than a region where the laser light emitted by the light source hits for a first time in a radial direction of the rotation shaft. The window has an inclined posture in which a distance from the rotation shaft is shorter at position adjacent to the detector than at position adjacent to the light source.

DETAILED DESCRIPTION

A device suppresses detection of stray light by a detector. The device includes a light blocking section that partitions a light projecting space and a light receiving space in order to suppress stray light from entering the light receiving space from the light projecting space.

By providing the light blocking section, it is possible to prevent the projected light from entering the light receiving space directly from the light projecting space. However, the light blocking section cannot prevent stray light that is reflected by a window, reflected again by a mirror, and then detected by the detector on the path of going out of the device and entering the detector.

Figure 20:
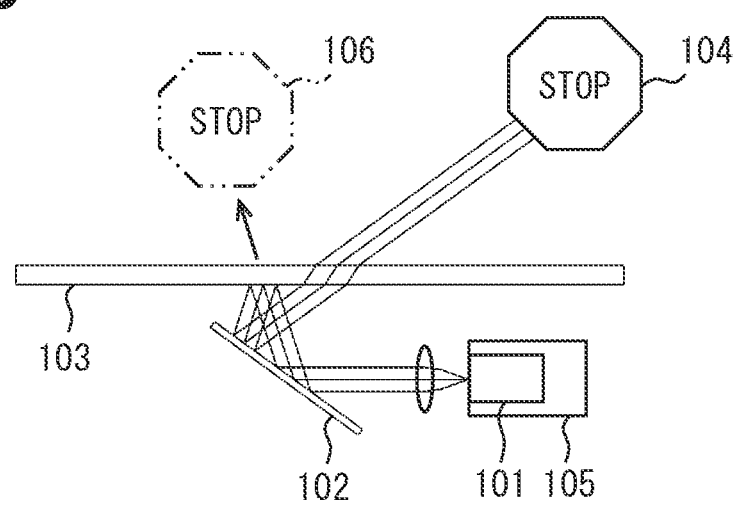
FIG. 20 is a diagram for explaining an optical path of stray light.

An example of stray light that will be described with reference to FIG. 20, which is reflected by a window, reflected again by a mirror, and then detected by the detector on the path of going out of the device and entering the detector. A light projected from a light source 101 is reflected by a mirror 102 in the device and strikes a window 103 of the device. Then, the light reflected by the window 103 is reflected again by the mirror 102, and exits the device by passing through the window 103. When the light emitted from the device hits a retroreflector 104, the light travels toward the light source 101 by hitting the mirror 102 in the device in the reverse path, being reflected by the window 103, and being reflected again by the mirror 102. If the light source 101 and the detector 105 are close to each other, the light traveling toward the light source 101 through the above-described path may be detected by the detector 105. When the light is detected by the detector 105 along such a path, it is erroneously determined that a direction in which the retroreflector 104 exists is a direction in which the ghost 106 exists.

The present disclosure has been made based on this situation, and provides a laser radar device capable of suppressing a detection of stray light that goes out of the device and enters the device.

The laser radar device is achieved by a combination of features described in independent claims and sub-claims define further advantageous examples of the disclosure. Note that a reference numeral in parentheses in claims indicate a correspondence relationship with specific means described in embodiments to be described later as one aspect, and does not limit the technical scope of the present disclosure.

According to one aspect of the disclosure, a laser radar device includes: a light source configured to emit laser light; a mirror rotatable about a rotation shaft to reflect the laser light emitted by the light source; a window through which the laser light reflected by the mirror passes; and a detector configured to detect the laser light passing through the window to be reflected by the mirror. The mirror has a low reflection area having a lower reflectance than the other region of the mirror, in a state where a mirror surface of the mirror faces toward the light source, at position adjacent to the light source than the detector in an axial direction of the rotation shaft and adjacent to the window than a region where the laser light emitted by the light source hits for a first time in a radial direction of the rotation shaft. The window has an inclined posture in which a distance from the rotation shaft is shorter at position adjacent to the detector than at position adjacent to the light source.

According to another aspect of the disclosure, a laser radar device includes: a light source configured to emit laser light; a mirror rotatable about a rotation shaft to reflect the laser light emitted by the light source; a window through which the laser light reflected by the mirror passes; and a detector configured to detect the laser light passing through the window to be reflected by the mirror. The mirror has a low reflection area having a lower reflectance than the other region of the mirror, in at least a part of an area where a stray light to be detected by the detector hits the mirror, after the laser light emitted by the light source is reflected by the mirror, the window, and the mirror in this order and exiting through the window to be reflected by an external object and passing through the window to be reflected in order of the mirror, the window, and the mirror, within a rotation angle range in which the laser light emitted by the light source is reflected by the window and hits the mirror again. The window has an inclined posture in which a distance from the rotation shaft is shorter at position adjacent to the detector than at position adjacent to the light source.

The laser radar device has the low reflection area formed in at least a part of the area where the stray light hits the mirror. Therefore, the intensity of the stray light entering the detector is reduced. Thus, detection of this stray light can be suppressed.

In addition, the window has the inclined posture in which the distance from the rotation shaft is shorter at position adjacent to the detector than at position adjacent to the light source. As a result, the travelling direction of the laser light reflected by the window is shifted away from the mirror, compared to a case where the distance from the window to the rotation shaft is the same between the position adjacent to the light source and the position adjacent to the detector. Therefore, compared to the case where the distance from the window to the rotation shaft is the same, the low reflection area can be made smaller. By making the low reflection area small, normal laser light, which is not stray light, is less likely to be weakened in the low reflection area, so the SN ratio can be improved.

Figure 1:
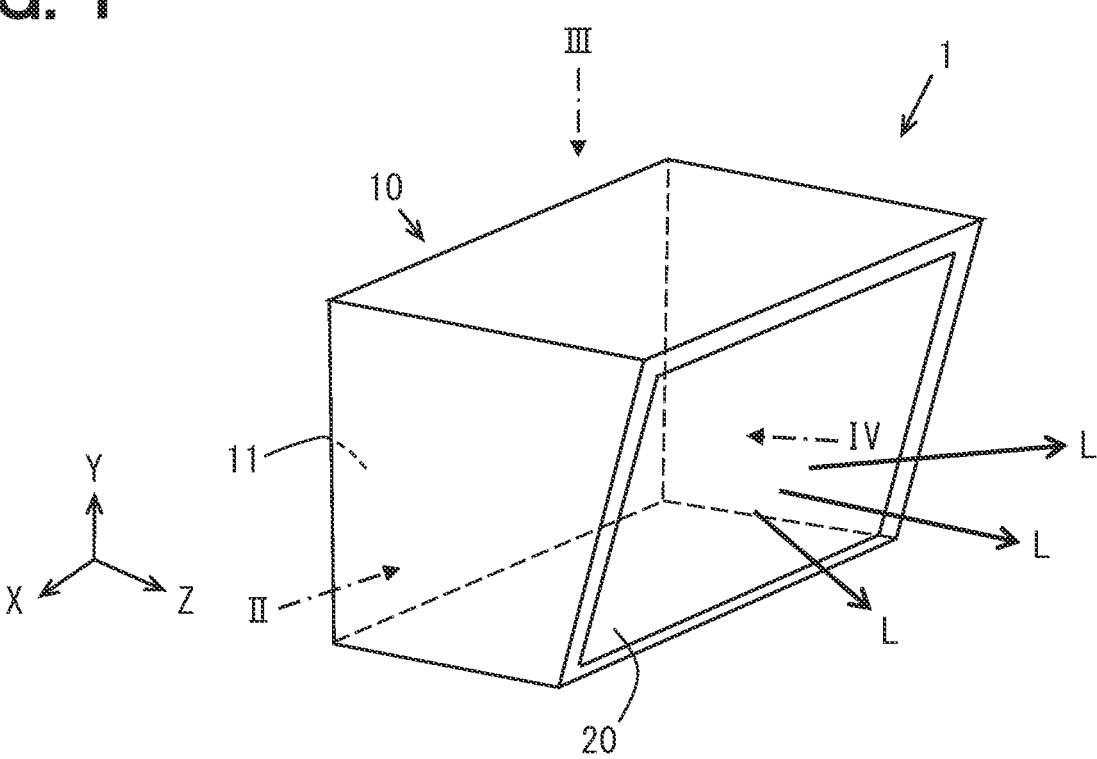
FIG. 1 is a schematic diagram illustrating a laser radar device according to an embodiment.

An embodiment will be described below with reference to the drawings. FIG. 1 is a schematic diagram illustrating a laser radar device 1 according to the embodiment. The laser radar device 1 includes a housing 10 and a window 20. The housing 10 is provided with an opening into which the window 20 is fitted. The window 20 is fitted into the opening of the housing 10 in an inclined posture with respect to a flat back plate portion 11 of the housing 10 opposite to the window 20.

The window 20 is light transmissive, flat and rectangular in shape. The laser radar device 1 irradiates a laser light L from the window 20 to the outside of the device. Glass can be used as the base material of the window 20. The base material of the window 20 may be a transparent resin.

The laser radar device 1 irradiates the laser light L outward of the device while scanning. A direction perpendicular to the window 20 from the back plate portion 11 is defined as a front direction of the laser radar device 1. Let the front direction be a Z direction. A plane perpendicular to the Z axis is an XY plane. When the laser light L is reflected at position outside the device, a part of the reflected laser light L enters the laser radar device 1 through the window 20.

The laser radar device 1 is attached to a vehicle and detects an object around the vehicle. One or more laser radar devices 1 are attached to a vehicle in order to detect objects around the vehicle. The laser radar device 1 can be attached to the vehicle in any orientation. In the description of the embodiment, for convenience, a positive direction in the Y axis is defined as an upward direction of the vehicle. Hereinafter, the upward direction of the vehicle will simply be referred to as the upward direction.

Figure 2:
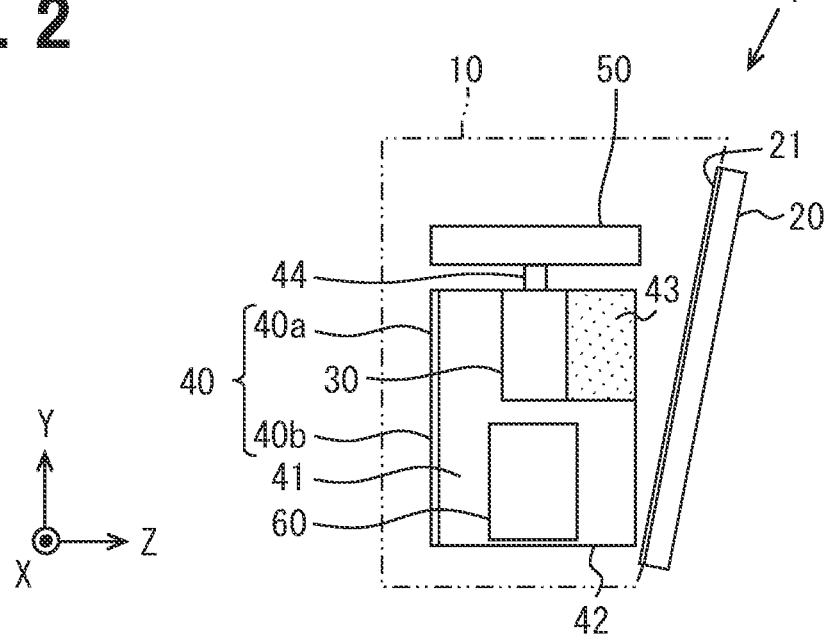
FIG. 2 is a diagram showing a relative position between an optical system and a window as viewed in a direction II in FIG. 1.
Figure 3:
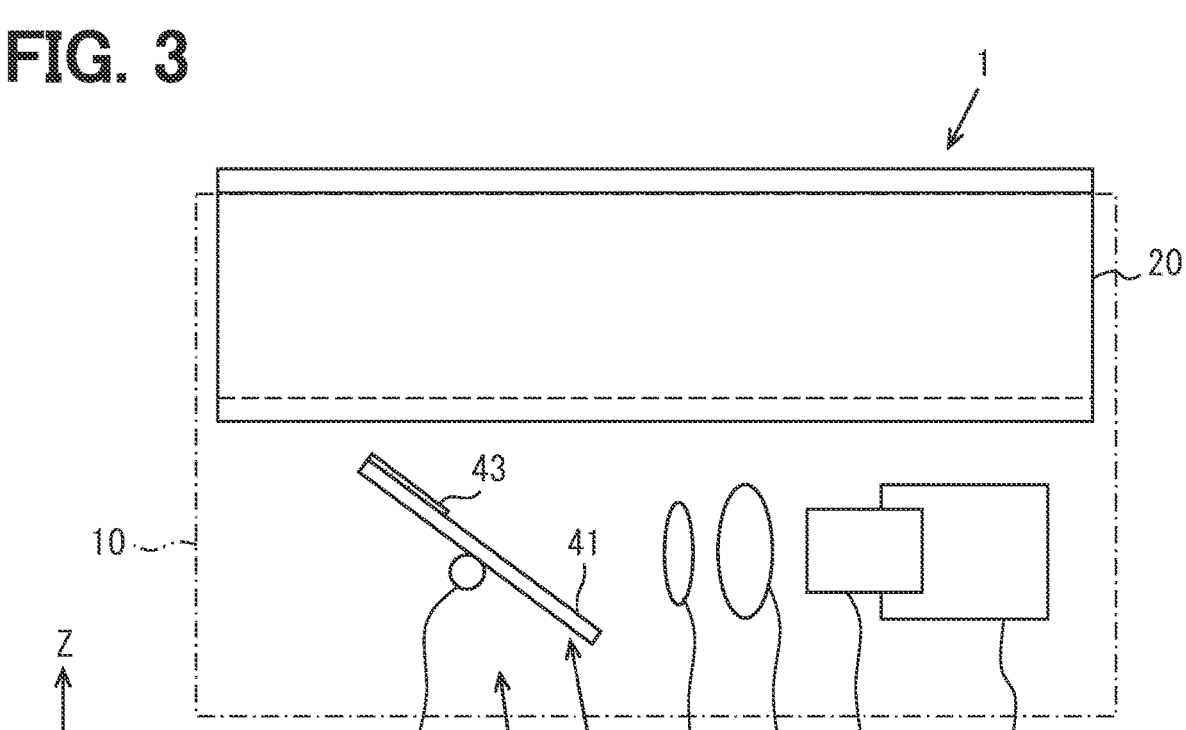
FIG. 3 is a diagram showing a relative position between the optical system and the window as viewed in a direction III in FIG. 1.
Figure 4:
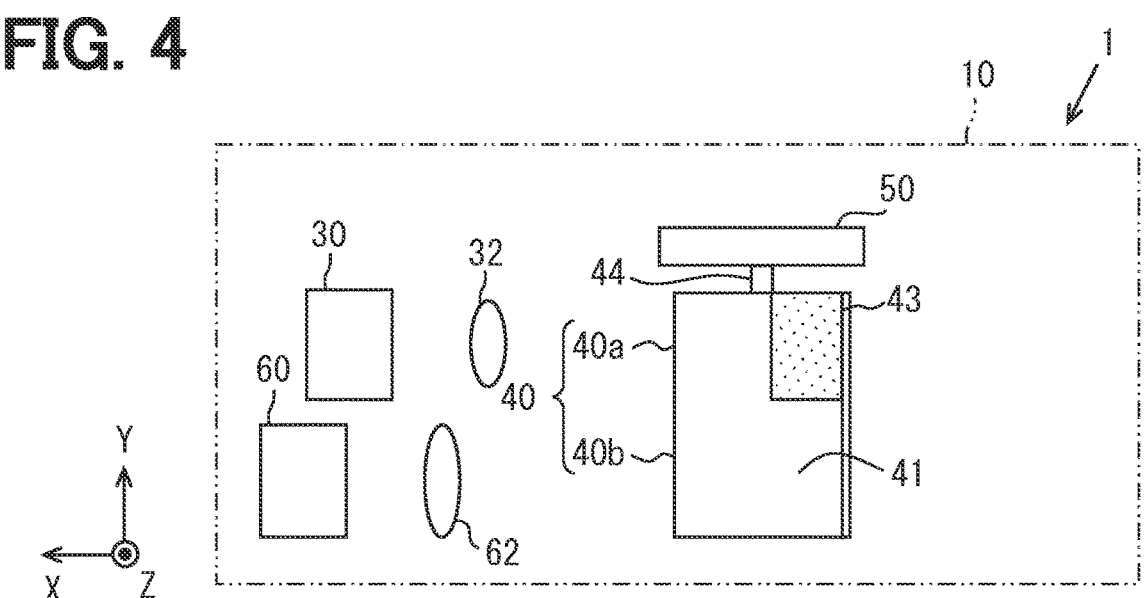
FIG. 4 is a diagram showing a relative position among components of the optical system as viewed in a direction IV in FIG. 1.

FIGS. 2 and 3 explain component positions of an optical system provided inside the housing 10 and the window 20. In the following diagrams, configurations other than those necessary for explanation are omitted as appropriate. FIG. 2 is a diagram viewed from a direction II in FIG. 1. FIG. 3 is a diagram viewed from a direction III in FIG. 1. FIG. 4 is a diagram viewed from a direction IV in FIG. 1, and shows the relative positions of the components of the optical system. The internal surface of the window 20 inside the device is coated with an antireflection film 21. The external surface of the window 20 may also be coated with an antireflection film. The optical system includes a light source 30, a projection lens 32, a mirror 40, a motor 50, a detector 60 and a light-receiving lens 62.

The light source 30 emits laser light L, and a laser diode can be used as the light source 30. The laser light L emitted by the light source 30 is directed toward the mirror 40. The projection lens 32 is provided between the light source 30 and the mirror 40 and suppresses the diffusion of the laser light L.

The mirror 40 has a plate portion 42 with one surface being a mirror surface 41. The mirror surface 41 has a rectangular shape, in which the short sides are parallel to the Z axis and the long sides are parallel to the rotation shaft 44. The long sides may be parallel to the Z axis, and the short sides may be parallel to the rotation shaft 44. The shape of the mirror surface 41 may be square.

A low reflection area 43 is formed on a part of the mirror surface 41. The upper portion of the mirror 40, in other words, adjacent to the light source 30 is a first mirror portion 40a that reflects the laser light L emitted by the light source 30. The lower portion of the mirror 40, in other words, adjacent to the detector 60 is a second mirror portion 40b that reflects the laser light L entering the device through the window 20 toward the detector 60. The mirror 40 is an integral light emitting and receiving type having the first mirror portion 40a and the second mirror portion 40b.

The rotation shaft 44 is attached to the plate portion 42. The rotation shaft 44 is parallel to the Y-axis and arranged at position passing through the center of the plate portion 42 between the short sides opposing to each other. The rotation shaft 44 is integrated with a rotation shaft of the motor 50. Therefore, the mirror 40 is driven by the motor 50 and rotates around the rotation shaft 44. Rotation is not limited to 360 degrees, but includes, for example, 120 degrees and 150 degrees in an angle range narrower than 360 degrees. Rotation of the mirror 40 in the angle range narrower than 360 degrees means that the mirror 40 reciprocates. When the mirror 40 rotates while the light source 30 is continuously emitting the laser light L, the laser light L is emitted outward of the device through the window 20 while being scanned in the XZ plane.

A part of the laser light L reflected by an external object outside the device enters the device through the window 20, and is reflected by the mirror 40 to travel toward the detector 60. The detector 60 is arranged below the light source 30 in the Y-axis direction. The light source 30 and the detector 60 are arranged on the same plane parallel to the XY plane. A photodiode can be used for the detector 60.

The light-receiving lens 62 is arranged between the mirror 40 and the detector 60 in the travelling direction of the laser light L that enters the device from the outside to be reflected by the mirror 40. The light-receiving lens 62 condenses the laser light directed from the mirror 40 toward the detector 60.

As shown in FIG. 2, the window 20 is in an inclined posture such that the distance from the rotation shaft 44 is shorter at position adjacent to the detector 60 than at position adjacent to the light source 30. The distance is defined along the Z axis.

Figure 5:
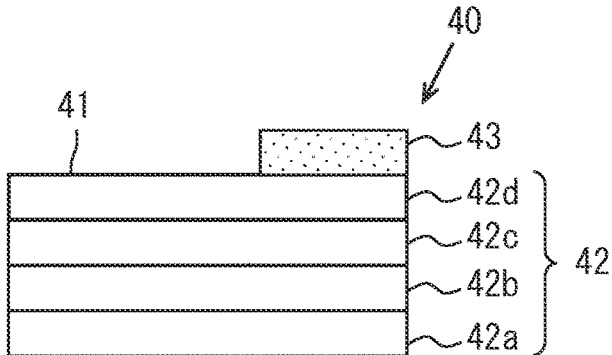
FIG. 5 is a detailed configuration diagram of a mirror of the embodiment.

FIG. 5 shows the detailed configuration of the mirror 40 of this embodiment. The plate portion 42 of the mirror 40 has a structure in which a sheet glass 42*a*, an adhesion film 42*b*, a silver thin film 42*c*, and a protective film 42*d* are stacked in this order. The upper side surface of the protective film 42*d* in FIG. 5 is the mirror surface 41. A part of the mirror surface 41 is formed with the low reflection area 43 described above.

The low reflection area 43 has a lower reflectance than the mirror surface 41. The low reflection area 43 can be formed, for example, by applying matte paint to the area by screen printing or the like. The paint color is black, for example. The low reflection area 43 can also be said to be an area in which the reflection of light is suppressed more than the mirror surface 41 by absorbing or attenuating the irradiated light.

[Position of Low Reflection Area 43]

As shown in FIG. 2, when the mirror surface 41 of the mirror 40 faces the light source 30, the low reflection area 43 is formed on the rectangular mirror surface 41 at position where the Y-axis side faces the light source 30 and the Z-axis side is biased toward one of the long sides of the mirror surface 41. In other words, when the mirror surface 41 of the mirror 40 faces the light source 30, the low reflection area 43 is positioned closer to the light source 30 than the detector 60 in the Y-axis direction and closer to the window 20 than an area where the laser light L emitted by the light source 30 hits for the first time in the Z-axis direction. The reason why the low reflection area 43 is formed at this position and having this size will be described below. A state in which the mirror surface 41 of the mirror 40 faces the light source 30 is a state in which the laser light L emitted by the light source 30 directly hits the mirror 40.

Figure 6:
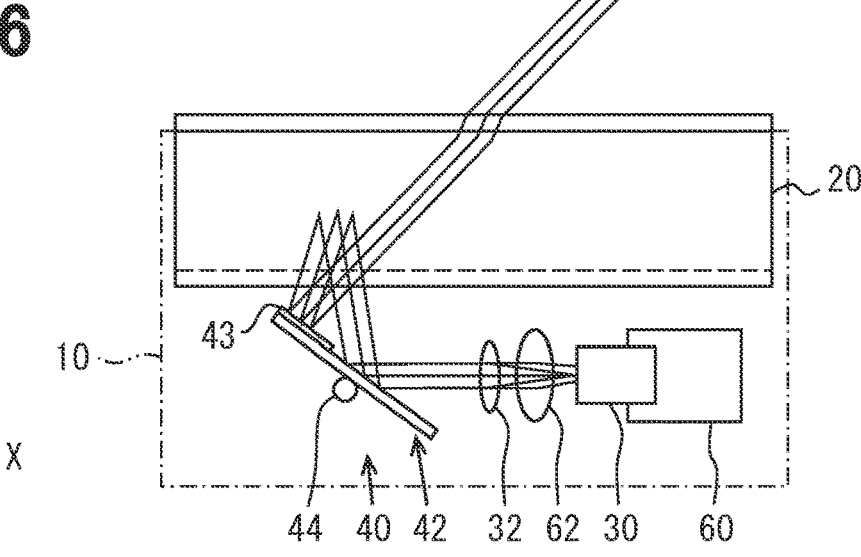
FIG. 6 is a diagram showing a path of laser light as stray light.

FIG. 6 shows a path of the laser light L when a stray light to be suppressed by the low reflection area 43 occurs. The laser light L emitted by the light source 30 hits the mirror 40 after passing through the projection lens 32. The laser light L emitted by the light source 30 and irradiated outward of the device is called a projection beam.

The projection beam reflected by the mirror 40 is reflected by the window 20, re-reflected by the mirror 40, and exits the device from the window 20. Then, the projection beam is reflected by an external object outside the device, and is received by the detector 60 as stray light. When simply describing stray light, the stray light means the laser light L detected by the detector 60 along this path.

As can be seen from FIG. 6, when the projection beam reflected by the mirror 40 is reflected by the window 20, re-reflected by the mirror 40, and exits the device from the window 20, an area where the projection beam hits the mirror 40 at the re-reflection time is closer to the window 20 than an area where the projection beam strikes the mirror 40 for the first time.

Figure 7:
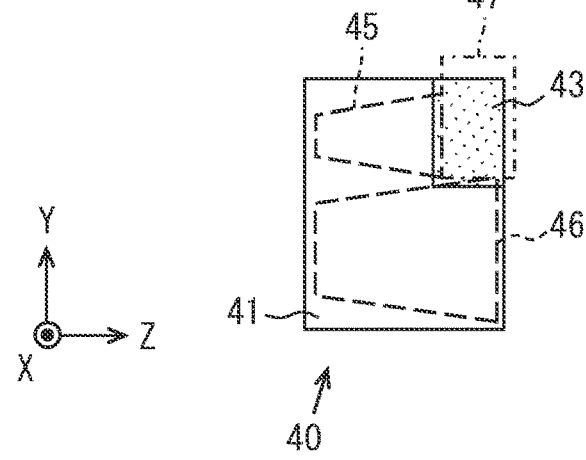
FIG. 7 is a diagram showing positions of a projection region, a light receiving region, and a stray light region in the mirror.

FIG. 7 conceptually shows a projection region 45 where the projection beam hits the mirror 40 and a light receiving region 46 where the reception beam hits the mirror 40. The reception beam means a laser light L that is reflected by an external object outside the device and enters the device again.

The reason why the projection region 45 is trapezoidal in FIG. 7 is as follows. The projection beam is adjusted to spread in the Y-axis direction as traveling, and the mirror 40 in FIG. 7 is tilted with respect to the optical axis of the projection beam. The left side of the mirror 40 shown in FIG. 7 is closer to the light source 30 than the right side of the mirror 40 shown in FIG. 7 is. Therefore, the projection region 45 is trapezoidal. The light receiving region 46 is also trapezoidal because the mirror 40 shown in FIG. 7 is closer to the detector 60 on the left side than on the right side.

Figure 8:
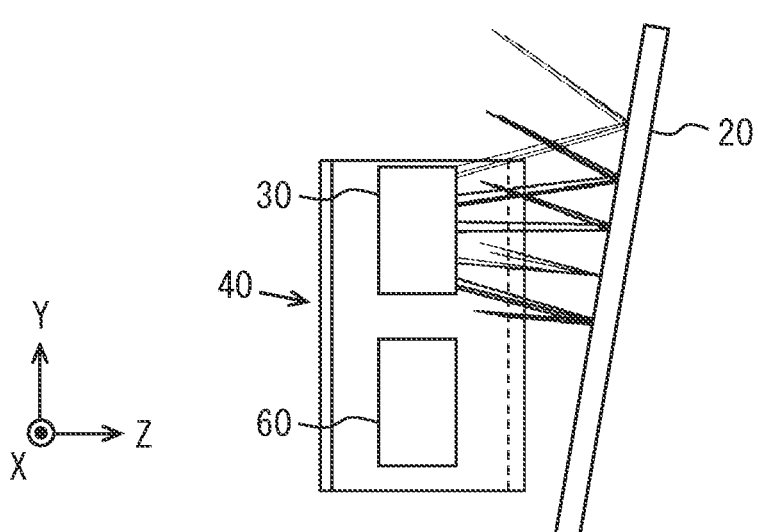
FIG. 8 is a diagram showing a traveling direction of a projection beam reflected by the window.

FIG. 8 shows the travelling direction of the projection beam traveling in various directions when the projection beam is reflected by the window 20. It should be noted that FIG. 8 omits the low reflection area 43. The projection beam shown in FIG. 8 is a part of the projection beam projected by the laser radar device 1. As can be seen from FIG. 8, in the vicinity of the mirror 40, the range of the projection beam reflected by the window 20 in the Y-axis direction partially overlaps the range of the projection beam directed toward the window 20. As described above, as shown in FIG. 7, the low reflection area 43 is located adjacent to the light source 30 in the Y-axis direction, in the mirror 40. The position of the low reflection area 43 in the radial direction of the rotation shaft 44 is closer to the window 20 than the region where the projection beam hits the mirror 40 for the first time in the state where the mirror surface 41 faces the light source 30.

[Size of Low Reflection Area 43]

Figure 9:
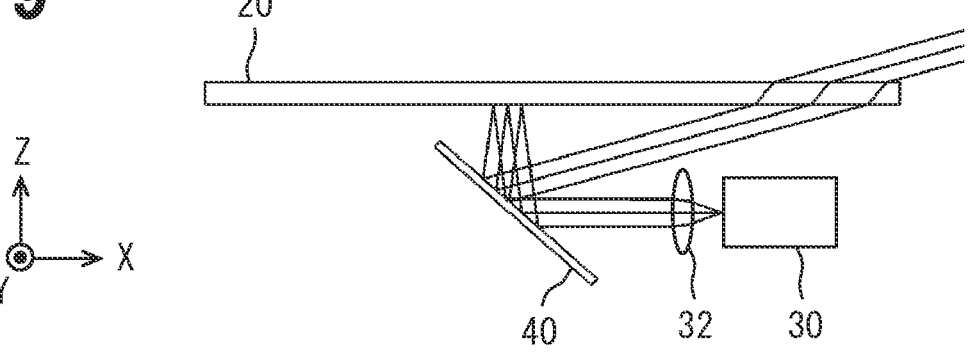
FIG. 9 is a diagram showing the minimum incident angle at which stray light occurs.
Figure 10:
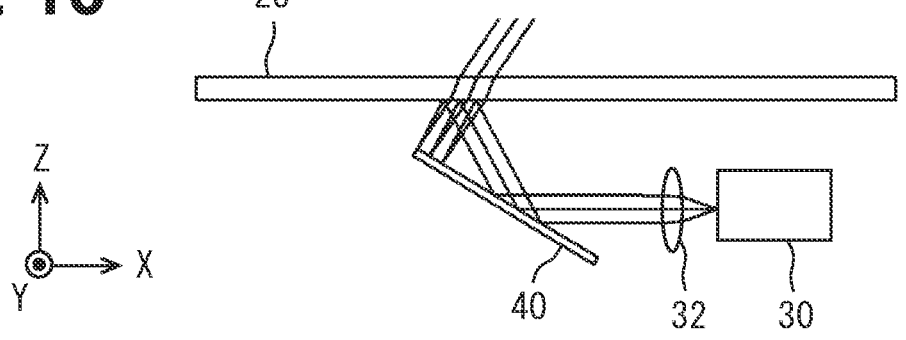
FIG. 10 is a diagram showing the maximum incident angle at which stray light occurs.

Next, the size of the low reflection area 43 will be explained. FIG. 9 is a diagram in which the incident angle of the laser light L from the light source 30 entering the mirror 40 is minimized when stray light occurs. FIG. 10 is a diagram showing the maximum incident angle when stray light occurs. FIGS. 9 and 10 are diagrams for explaining the rotation angle range of the mirror 40 in which stray light occurs. For easy understanding, the window 20 is not slanted, differently from the laser radar device 1 of the embodiment.

In FIG. 9, the projection beam reflected by the window 20 and re-reflected by the mirror 40 passes through the end of the window 20 and exits the device. If the incident angle of the laser light L is made smaller than this, the projection beam re-reflected by the mirror 40 hits the frame of the window 20 and does not exit the device.

In FIG. 10, the projection beam reflected by the window 20 hits the region of the mirror 40 closest to the window 20. If the incident angle of the laser light L is increased any further, the projection beam reflected by the window 20 will not strike the mirror 40.

Figure 11:
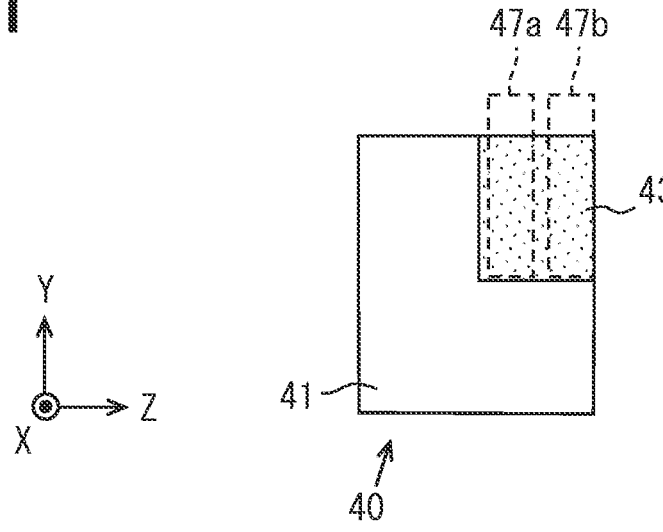
FIG. 11 is a diagram showing stray light regions in FIGS. 9 and 10.

FIG. 11 shows the positional relationship between the mirror 40 and the stray light region 47a produced in the state of FIG. 9 and the stray light region 47b produced in the state of FIG. 10. In the stray light region 47a, 47b, the projection beam is reflected by the window 20 and hits the mirror 40 or passes near the mirror 40. The two stray light regions 47a and 47b shown in FIG. 11 and the region between the two stray light regions 47a and 47b are the stray light region 47 shown in FIG. 7. In the stray light region 47, the stray light strikes the mirror 40 or passes near the mirror 40 in the rotation angle range of the mirror 40 in which the stray light occurs. The size of the low reflection area 43 is determined so as to include an area where the stray light region 47 and the mirror surface 41 of the mirror 40 overlap with each other.

The stray light region 47 shown in FIG. 7 includes an area outside the mirror surface 41. The area outside the mirror surface 41 in the stray light region 47 is larger, when the window 20 is tilted as in the present embodiment, compared with a case where the window 20 is not tilted.

Figure 12:
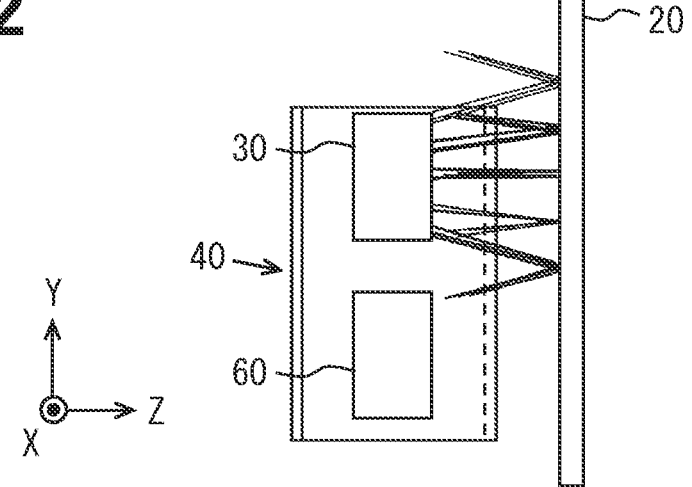
FIG. 12 is a diagram showing a traveling direction of a projection beam when the window is not tilted.

FIG. 12 shows a comparison case where the window 20 is not tilted, in which the travelling direction of the projection beam reflected by the window 20 is indicated. As can be seen by a comparison between FIG. 12 and FIG. 8, the travelling direction of the projection beam reflected by the window 20 is upward in the Y-axis when the window 20 is tilted than when the window 20 is not tilted.

Figure 13:
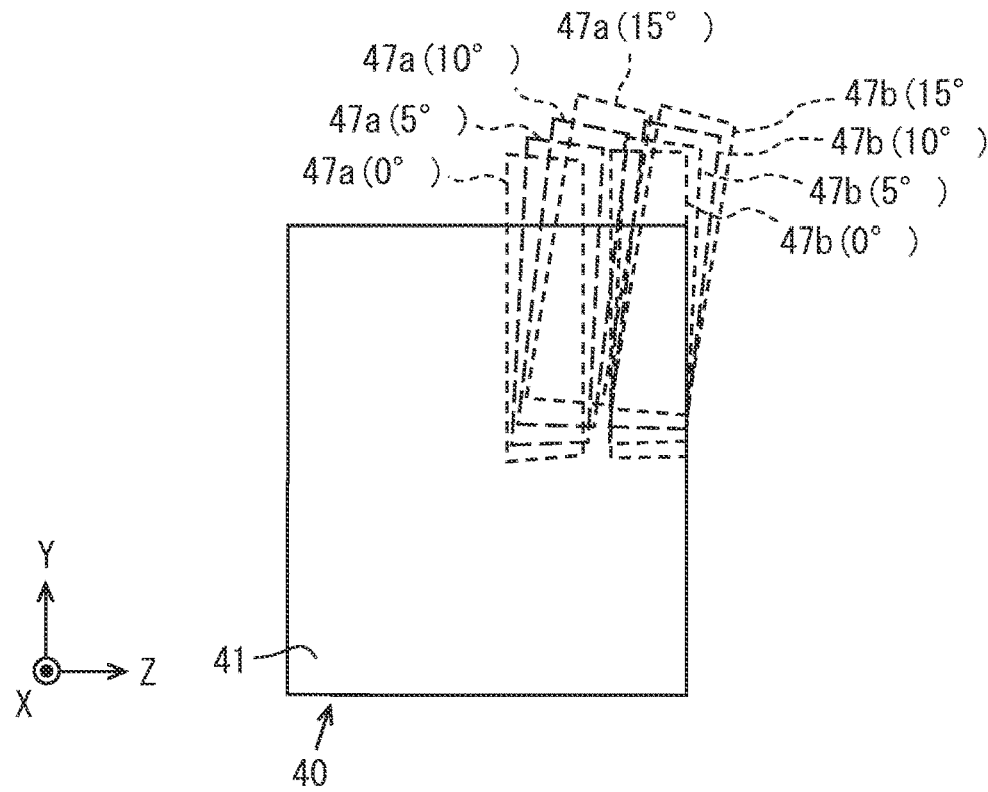
FIG. 13 is a diagram showing changes in position of the stray light regions with respect to changes in inclination of the window.

FIG. 13 shows changes in position of the stray light region 47a, 47b with respect to the mirror 40 when the tilt of the window 20 is changed. In FIG. 13, the angle in parentheses is the tilt angle of the window 20 with respect to the XY plane.

As can be seen in FIG. 13, when the window 20 is tilted, the stray light region 47 moves upward relative to mirror 40, compared with a case where the window 20 is not tilted. The stray light region 47 moves toward the window 20 relative to the mirror 40 when the window 20 is tilted compared with a case where the window 20 is not tilted.

Referring back to FIG. 7. In FIG. 7, the stray light region 47 partially overlaps the projection region 45 and the light receiving region 46. Accordingly, the low reflection area 43 formed to include the stray light region 47 also partially overlaps the projection region 45 and the light receiving region 46. As the stray light region 47 moves upward and rightward in FIG. 7, the low reflection area 43 becomes smaller. As the low reflection area 43 becomes smaller, the overlap area between the low reflection area 43 and the projection region 45 and the light receiving region 46 becomes smaller. When the overlap area between the low reflection area 43 and the projection region 45 and the light receiving region 46 is reduced, the regular laser light L is restricted from being weakened in the low reflection area 43. As a result, the SN ratio is improved.

Overview of Embodiment

In the laser radar device 1 of the embodiment, the low reflection area 43 is formed in the first mirror portion 40a of the mirror 40. The low reflection area 43 is formed in the area where stray light strikes the mirror 40. Therefore, the laser radar device 1 can suppress detection of stray light.

In addition, the window 20 is in an inclined posture such that the distance from the rotation shaft 44 is shorter at position adjacent to the detector 60 than at position adjacent to the light source 30. As a result, the low reflection area 43 can be made smaller, compared with a case where the window 20 is not tilted, that is, when the distance from the window 20 to the rotation shaft 44 is the same between the position adjacent to the light source 30 and the position adjacent to the detector 60. The regular laser light L, which is not stray light, is less likely to be weakened in the low reflection area 43 which is made small, so that the SN ratio can be improved.

In addition, since the antireflection film 21 is provided on the internal surface of the window 20, the laser light L is restricted from being reflected by the internal surface of the window 20 so as to suppress the stray light.

Second Embodiment

Next, a second embodiment will be described. In the following description of the second embodiment, elements having the same reference symbols as those used so far are the same as the elements having the same reference symbols in the previous embodiment, except when specifically mentioned. When only a part of the configuration is described, the embodiment described above can be applied to other parts of the configuration.

Figure 14:
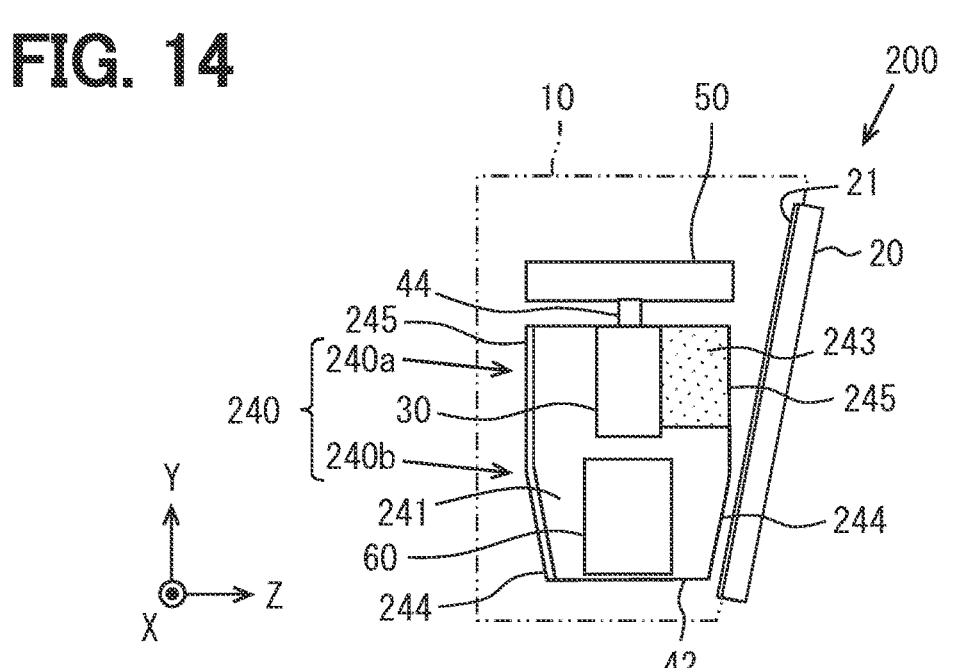
FIG. 14 is a diagram showing a laser radar device according to a second embodiment.

FIG. 14 shows a laser radar device 200 of the second embodiment, in which the shape of the mirror 240 differs from the mirror 40 of the first embodiment in. The mirror 240 includes a first mirror portion 240a and a second mirror portion 240b. The first mirror portion 240a has the same shape as the first mirror portion 40a of the first embodiment. The shape of the second mirror portion 240b is different from that of the second mirror portion 40b of the first embodiment.

The length of the second mirror portion 240b in the radial direction of the rotation shaft 44 becomes shorter toward the lower side in FIG. 14, that is, toward the side opposite to the first mirror portion 240a. Therefore, in the second mirror portion 240b, both outer sides of the second mirror portion 240b in the radial direction of the rotation shaft 44 form an inclined side portion 244 that approaches the rotation shaft 44 toward the end of the mirror 240 adjacent to the detector 60.

The inclined side portion 244 is parallel to the window 20, in other words, along the window 20. The state in which the inclined side portion 244 is along the window 20 includes not only the state in which the inclined side portion 244 is completely parallel to the window 20 but also the state in which the inclined side portion 244 is nearly parallel to the window 20.

The first mirror portion 240a has a parallel side portion 245 parallel to the rotation shaft 44 at the outer side in the radial direction of the rotation shaft 44. The mirror surface 241 of the mirror 240 having such a shape has a line-symmetrical shape as a whole with the rotation shaft 44 as an axis of symmetry.

The mirror 240 has the inclined side portion 244, and the distance between the window 20 and the optical system component such as the mirror 240 in the second embodiment is shorter than the distance between the window 20 and the optical system component such as the mirror 40 in the first embodiment. The distance between the window 20 and the mirror 240 is so short that the mirror 240 would hit the window 20 if the parallel side portion 245 extends to the end of the mirror 240 adjacent to the detector 60.

The closer the distance between the window 20 and the optical system component such as the mirror 240 is, the smaller the area where the stray light hits the mirror 240. Therefore, the low reflection area 243 included in the mirror 240 of the second embodiment can be made smaller than the low reflection area 43 included in the mirror 40 of the first embodiment. Since the low reflection area 243 can be made smaller, the SN ratio can be improved.

Also, the mirror surface 241 of the mirror 240 has a line-symmetrical shape with the rotation shaft 44 as the axis of symmetry. As a result, the center of gravity of the mirror 240 is on the rotation shaft 44, so vibrations can be suppressed when the mirror 240 rotates.

Third Embodiment

In the third embodiment, a laser radar device that prevents clutter will be described. Unlike the stray light described above, the clutter in this third embodiment is not the laser light L that has once exited the device, but the projection beam that is reflected by the window 20 and then reflected by the mirror 40 toward the detector 60, which is the laser light L to be detected by the detector 60.

Therefore, clutter can occur when the mirror 40 reflects the projection beam in the 0° direction of the Z coordinate. Detection of clutter can be suppressed by inclining the window 20. In the third embodiment, the window 20 is inclined to prevent clutter from being detected.

Figure 15:
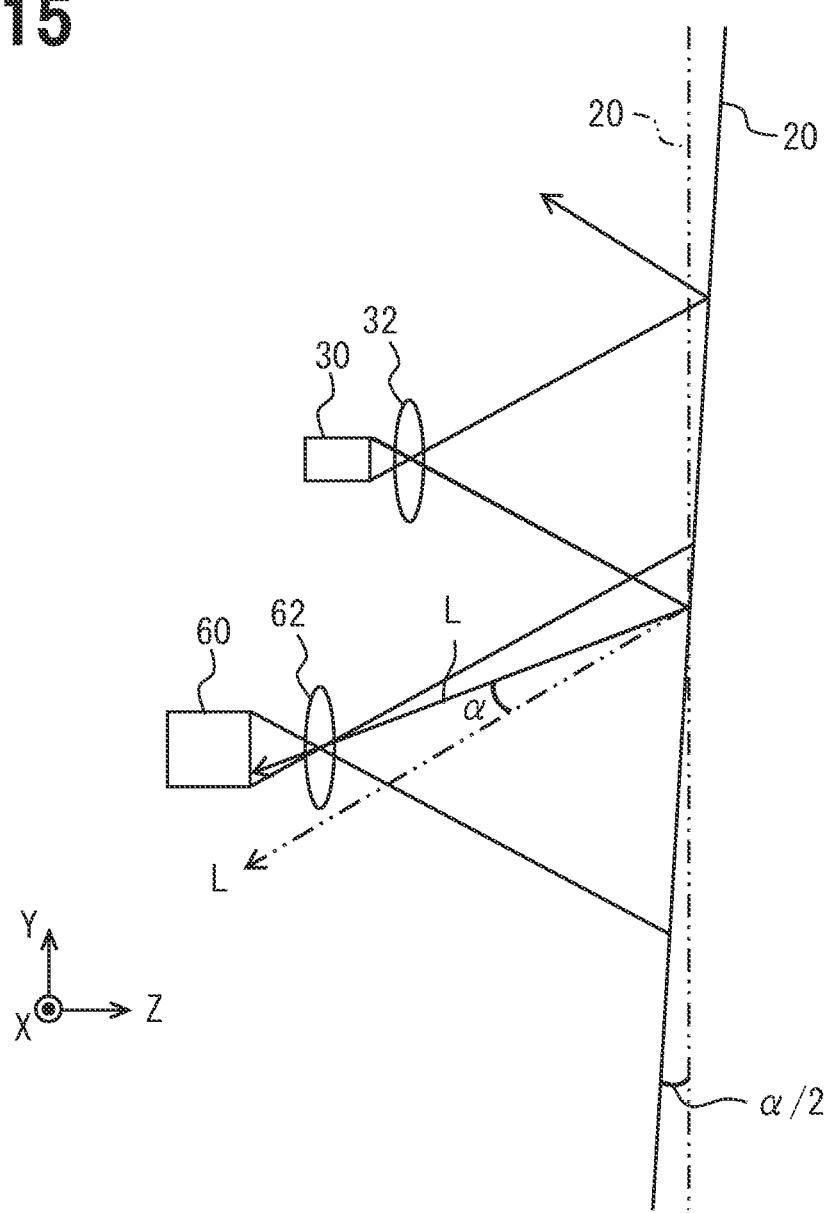
FIG. 15 is a diagram for explaining an inclination angle of a window for suppressing detection of clutter.

The inclination angle of the window 20 for suppressing detection of clutter will be described with reference to FIG. 15. In FIG. 15, the optical path between the light source 30 and the window 20 and the optical path between the detector 60 and the window 20 are set straight for the sake of clarity of explanation.

Figure 16:
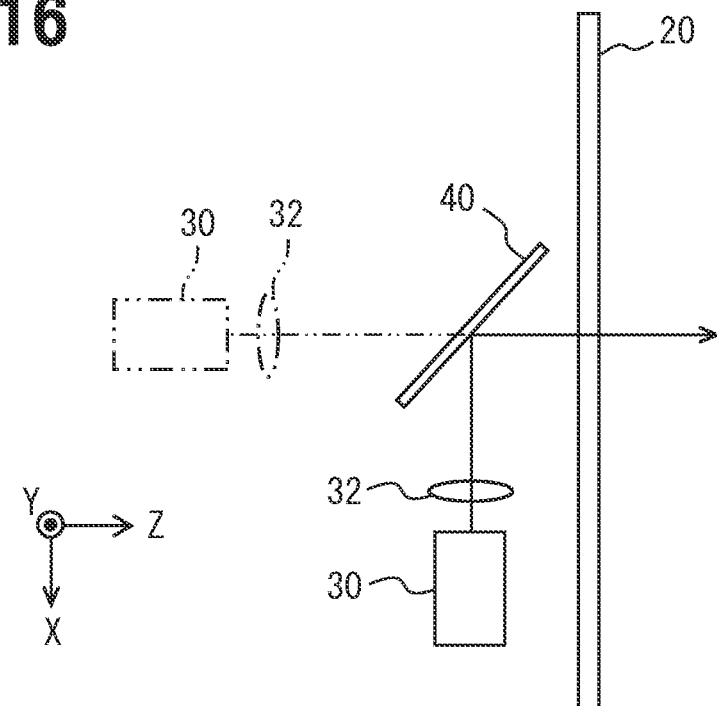
FIG. 16 is a diagram for explaining an arrangement of a light source in FIG. 15.

In other words, FIG. 15 illustrates the light source 30 at the position indicated by the double chain line shown in FIG. 16. The position of the light source 30 indicated by the double chain line is on a straight line including the travelling direction of the laser light L reflected by the mirror 40. As previously mentioned, clutter can occur when the mirror 40 reflects the projection beam in the 0° direction of the Z coordinate. Therefore, in the description of clutter, the light source 30, which is actually located at the position indicated by the solid line, may be considered to be located at the position indicated by the double chain line.

In FIG. 15, the window 20 indicated by the double chain line is the window 20 that is not tilted. The laser light L indicated by the double chain line indicates the traveling direction of the laser light L reflected by the non-inclined window 20 when the projection beam from the light source 30 is directed most downward in the Y-axis direction.

The laser light L indicated by the solid line is also the laser light L that is most directed downward in the Y-axis direction, among the projection beam from the light source 30. However, the solid line represents the traveling direction of the laser light L reflected by the inclined window 20 indicated by the solid line. The angle α is defined between the travelling direction of the laser light L indicated by the double chain line and the travelling direction of the laser light L indicated by the solid line. At this time, the inclination of the window 20 is α/2.

Therefore, the inclination of the window 20 is made larger than α/2. In this way, the laser light L emitted from the light source 30, which is most directed toward the detector 60, passes closer to the light source 30 than the detector 60, and is not incident on the detector 60. Therefore, clutter is not detected by the detector 60.

Although the embodiments have been described above, the disclosed technology is not limited to the above-described embodiment, and the following modifications are included in the present disclosure, and various modifications can be made without departing from the spirit of the present disclosure.

First Modification

Figure 17:
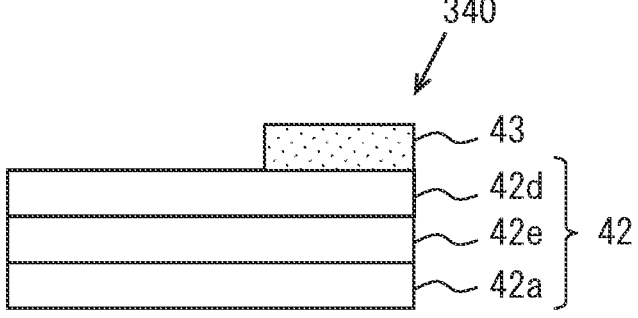
FIG. 17 is a diagram showing a mirror different from the embodiment.
Figure 18:
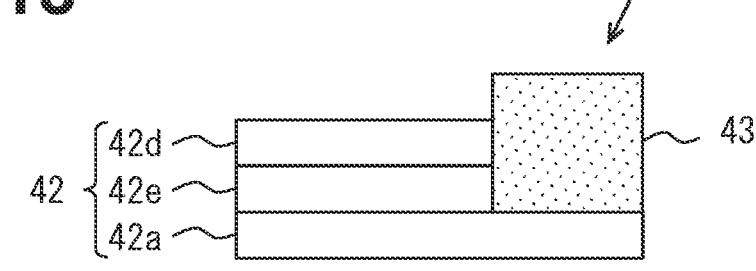
FIG. 18 is a diagram showing a mirror different from the embodiment.
Figure 19:
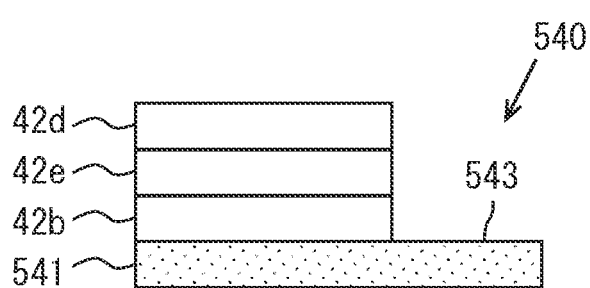
FIG. 19 is a diagram showing a mirror different from the embodiment.

FIGS. 17 to 19 show modifications in the configuration of the mirror. A mirror 340 shown in FIG. 17 includes an aluminum thin film 42e instead of the adhesion film 42b and the silver thin film 42c included in the mirror 40.

A mirror 440 shown in FIG. 18 includes a sheet glass 42a, an aluminum thin film 42e, a protective film 42d, and a low reflection area 43, similar to the mirror 340. However, the low reflection area 43 is directly laminated on the sheet glass 42a, differently from the mirror 340.

A mirror 540 uses a black resin plate 541 as a base material. An adhesion film 42b, an aluminum thin film 42e, and a protective film 42d are laminated thereon in this order. However, a low reflection area 543 is formed where the adhesion film 42b and the like are not laminated.

Second Modification

The mirror 40 has an axisymmetric shape with two inclined side portions 244 having the same length and inclination. However, the two inclined side portions 244 may have different lengths and inclinations. The parallel side portion 245 may be shorter and the inclined side portion 244 may be longer, compared with the embodiment. Further, the parallel side portion 245 may not be provided, and the inclined side portion 244 may extend from the end of the mirror adjacent to the light source 30 to the end of the mirror adjacent to the detector 60.

What is claimed is:
1. A laser radar device comprising:
a light source configured to emit laser light;
a mirror that is rotatable around a rotation shaft to reflect the laser light emitted by the light source;
a window through which the laser light reflected by the mirror passes; and
a detector configured to detect laser light passing through the window to be reflected by the mirror, wherein
no partition is provided between the light source and the detector,
the mirror has a low reflection area having a lower reflectance than the other region of the mirror, in a state where a mirror surface of the mirror faces toward the light source, at position adjacent to the light source than the detector in an axial direction of the rotation shaft and adjacent to the window than a region where the laser light emitted by the light source hits for a first time in a radial direction of the rotation shaft,
the window has an inclined posture in which a distance from the rotation shaft is shorter at position adjacent to the detector than at position adjacent to the light source, and
the window is slanted such that the laser light emitted by the light source and reflected by the window does not enter the detector while being most directed toward the detector.
2. A laser radar device comprising:
a light source configured to emit laser light;
a mirror that is rotatable around a rotation shaft to reflect the laser light emitted by the light source;

a window through which the laser light reflected by the mirror passes; and a detector configured to detect the laser light passing through the window to be reflected by the mirror, wherein no partition is provided between the light source and the detector, the mirror has a low reflection area having a lower reflectance than the other region of the mirror, in at least a part of an area where a stray light to be detected by the detector hits the mirror, after the laser light emitted by the light source is reflected by the mirror, the window, and the mirror in this order and exiting through the window to be reflected by an external object and pass through the window to be reflected in order of the mirror, the window, and the mirror, within a rotation angle range in which the laser light emitted by the light source is reflected by the window and hits the mirror again, the window has an inclined posture in which a distance from the rotation shaft is shorter at position adjacent to the detector than at position adjacent to the light source, and the window is slanted such that the laser light emitted by the light source and reflected by the window does not enter the detector while being most directed toward the detector.

3. The laser radar device according to claim 1, wherein the mirror has a length in a radial direction of the rotation shaft, and the length is shorter at an end of the mirror adjacent to the detector than at an end of the mirror adjacent to the light source.

4. The laser radar device according to claim 3, wherein the window has a flat plate shape, the mirror has an inclined side portion that is radially outer side adjacent to the detector and having an inclination that approaches the rotation shaft toward an end of the mirror adjacent to the detector, and a parallel side portion parallel to the rotation shaft at position adjacent to the light source, and the inclined side portion is inclined along the window.

5. The laser radar device according to claim 1, wherein a mirror surface of the mirror has a rectangular shape.

6. The laser radar device according to claim 3, wherein a mirror surface of the mirror has a line-symmetrical shape with the rotation shaft as an axis of symmetry.

7. The laser radar device according to claim 1, further comprising an antireflection film on an internal side of the window, or on the internal side and an external side of the window.

* * * * *